Dec. 12, 1939.                F. D. PARKER                 2,183,124
                        LIFTING AND PULLING DEVICE
                          Filed Aug. 13, 1938           2 Sheets-Sheet 1

INVENTOR.
Francis D. Parker.
BY Nathan Comstock
ATTORNEY.

Dec. 12, 1939.　　　F. D. PARKER　　　2,183,124
LIFTING AND PULLING DEVICE
Filed Aug. 13, 1938　　　2 Sheets-Sheet 2

INVENTOR.
Francis D. Parker
BY Nathan Comstock
ATTORNEY.

Patented Dec. 12, 1939

2,183,124

UNITED STATES PATENT OFFICE 2,183,124

LIFTING AND PULLING DEVICE

Francis D. Parker, La Farge, Wis.

Application August 13, 1938, Serial No. 224,673

9 Claims. (Cl. 254—75)

My invention relates to improvements in lifting and pulling devices in which a pivoted lever is adapted to be connected either to a fixed object or a weight to be moved, and has oppositely disposed hooks or dogs pivoted to each arm of the lever and adapted to engage a chain upon which the lift or pull is to be exerted.

The objects of my invention, are, first to provide an improved device of this character, sec10 ond to provide an improved device of this character which is simply constructed and can be easily manufactured, third to provide a device of this character in which the direction of movement of the lever mechanism relative to the chain may be reversed, fourth to provide improved means for reversing the direction of movement of the lever mechanism relative to the chain, fifth to provide improved hooks or dogs in a device of this character, sixth to provide means for guiding the chain so that it will be securely engaged by the hooks, seventh to provide means for guiding the chain, and eighth to provide improved means for moving the hook away from the chain in the reverse movement.

I attain these objects and other objects and advantages by the mechanism illustrated in the accompanying drawings, in which—

Figures 1, 2:
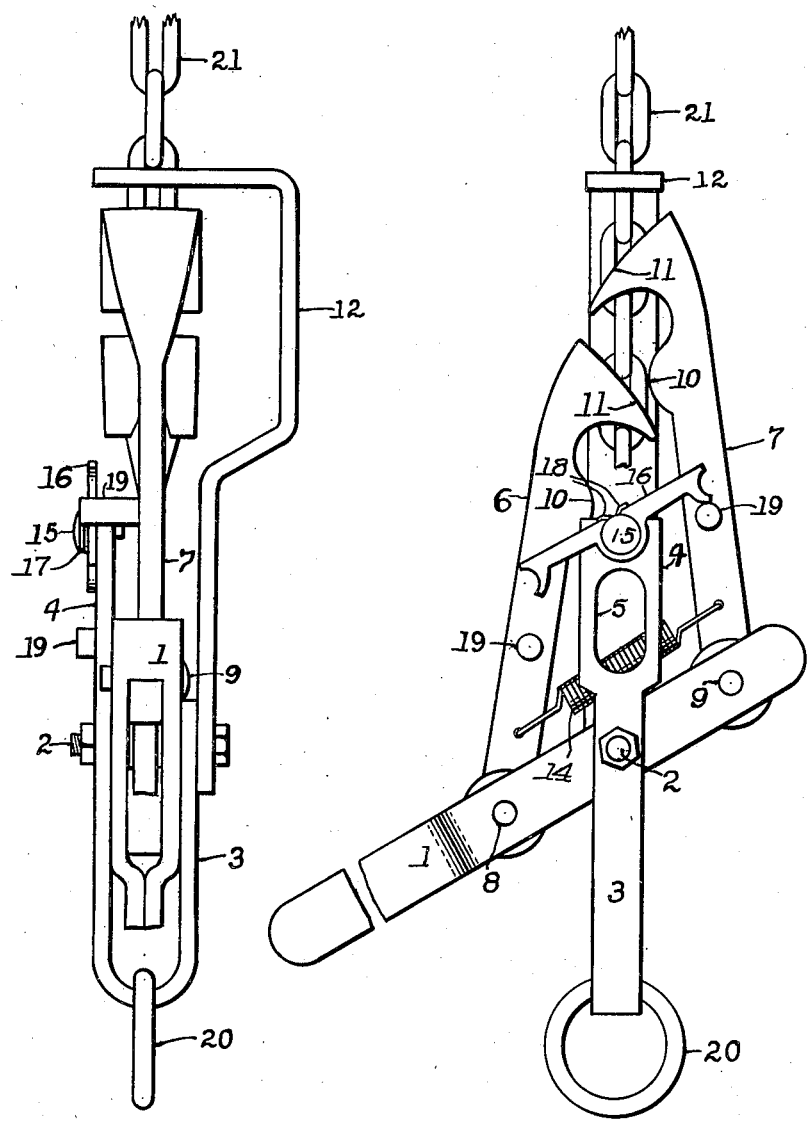
Figure 7:
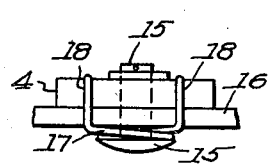
Figure 6:
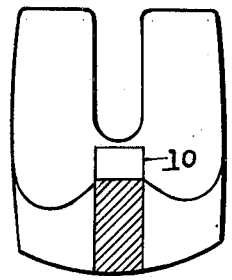
Figure 5:
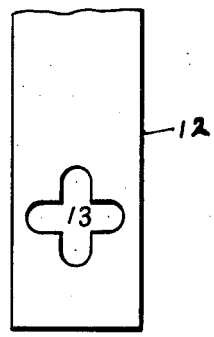
Figure 4:
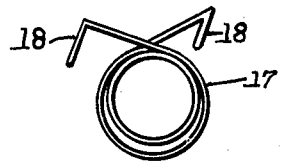
Figure 3:
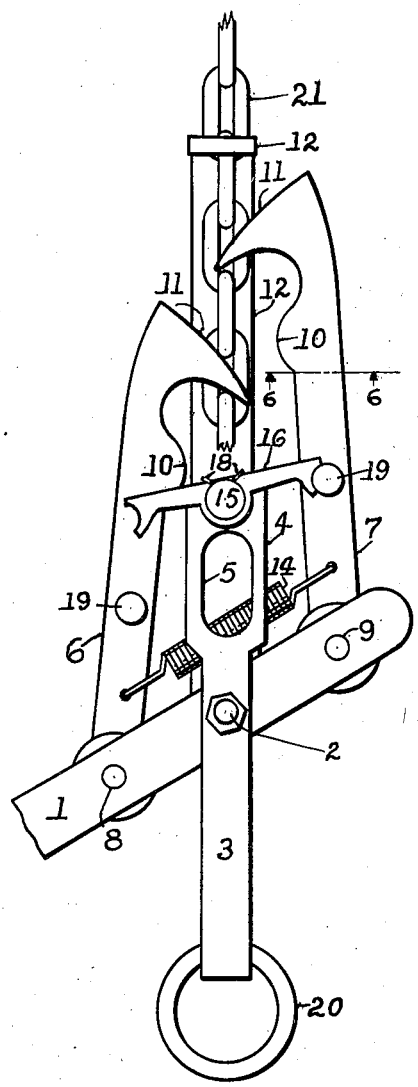

Figure 1 is a side elevation; Figure 2 is an end elevation of the device with part of the handle broken away; Figure 3 is a side elevation with the lever handle broken away and showing the thrust bar in position for moving a hook away from the chain in the reverse movement; Figure 4 is a detail view of the thrust bar spring; Figure 5 is a plan of a fragment of the guide showing the aperture for the chain; and Figure 6 is a section of a hook taken on the line 6—6 of Figure 3; and Fig. 7 is a fragmentary top plan of the bar 4, bolt 15, thrust bar 16, and spring 17.

An operating lever 1, is pivotally secured by a pin or bolt 2, to a clevis 3, one arm 4 of which is extended as shown in Figure 1, and provided with an aperture 5, for guiding the chain 21. The lever 1, is slotted and hooks or dogs 6 and 7 are pivoted in the slot on each side of and at equal distances from the pin or bolt 2, by pins or bolts 8 and 9. The hooks or dogs 6 and 7 are formed with inwardly projecting humps or bosses 10, and the claws of the hooks or dogs are pro50 vided with outside sloping curved portions 11. A guide bar 12, is pivoted upon the pin or bolt 2, and extends beyond the hooks or dogs and is provided with a suitable cruciform aperture 13 which tends to keep the chain from twisting and holds it and keeps the edge of the links engaged by the hooks in line with the slot between the claws so that the chain is guided and held in position for secure engagement by the hooks. A spring 14 connects the hooks or dogs 6 and 7 and tends to draw them together and into engagement with the chain 21.

A pin or bolt 15 pivotally secures a thrust bar 16 and a coiled spring 17 to the extended arm 4 of the clevis 3 near its end. The spring 17 with its coil pivoted upon the pin or bolt has its ends 18 crossed and bent at right angles in the same direction parallel to the axis of the coil and these ends extend across the top of the thrust bar 16 and the end of the arm 4, and tend normally to hold the thrust bar 16 at right angles to the arm 4. Studs or pins 19 upon the hooks or dogs 6 and 7 are adapted to be engaged by the thrust bar 16 as shown in Figure 3, to move the hooks or dogs away from the chain in the reverse movement of the device. A ring 20 upon the clevis 3 serves as a convenient means for connecting up the device for use and permits it to lie more closely in the direct line of pull when in operation.

In the operation of my device the chain 21 is passed through the aperture 13 in the guide 12 and is thus positioned so that the claws of the hooks or dogs will straddle the links of the chain edgewise on engagement with it, and the free end of the chain is passed through the aperture 5 of the extended arm of the clevis and is guided and held out of the way. As shown in Figure 1, the hook or dog 7, has completed its forward movement and is in full engagement with the chain 21, if now the lever 1 is tilted to move the hook 6 forward this hook will push the chain 21 against the boss 10 on the hook 7 and the outside sloping curved portion 11 of the hook 6 coming against the link of the chain in front of it and also against the opposite hook will be forced outward and moved forward until it reaches the fourth link of the chain from its position at the commencement of the forward movement, when it will be forced into engagement with that link by the pull of the spring 14. A tilting of the lever 1 in the opposite direction will then cause a similar forward movement of the hook 7. With the hooks in the position shown in Figure 1, when it is desired to make a backward movement of the hook 7, a tilting of the lever 1, so as to move the hook slightly will cause the outside slanting curved portion 11 of the claw of the hook to engage with the link of the chain in front of it and move the hook outward, and the thrust bar 16 having come into position behind the pin 19 on the hook 7 as shown in Figure 3, as the movement of the lever 1 and the hook 7 is reversed the hook will be moved away from the chain by the thrust bar 16 until it passes the hook 6 and the thrust bar 16 is released from the pin 19 on the hook 7 by the action of the spring 17, which permits the hook 7 to be drawn into engagement with the chain 21 by the action of the spring 14, after it has passed the hook 6 at the fourth link of the chain back of the starting point. A similar operation effects the reverse movement for the hook 6.

I am aware that prior to my invention lifting and pulling devices have been made with oppositely disposed hooks connected to the opposite arms of a pivoted lever. I therefore do not claim such a combination broadly, but I claim:

1. The combination in a lifting and pulling device, of a pivotally supported operating lever, oppositely disposed hooks provided with inwardly projecting bosses and claws having inclined outside curved portions adapted to engage a chain pivotally secured to each arm of the lever, a spring connecting said hooks tending to draw them together, a clevis for pivotally supporting the operating lever provided with an extended arm having an aperture for guiding the chain, a guide bar mounted on the pivotal connection of the clevis and operating lever extending beyond the hooks and provided with a suitable aperture for guiding the chain and holding it in position for secure engagement by the hooks, a thrust bar pivoted to the extended arm of the clevis, means yieldably holding the thrust bar at right angles to the extended arm of the clevis, and means on each of the hooks for engagement with the thrust bar for moving the hooks away from the chain on their backward movement.

2. The combination in a lifting and pulling device, of a clevis having an extended arm, an operating lever pivotally supported in said clevis, oppositely disposed hooks adapted to engage a chain pivotally secured to each arm of the lever, a thrust bar pivoted to the extended arm of the clevis, means for normally holding the thrust bar at right angles to the extended arm of the clevis, and means on each of the hooks for alternately engaging the opposite ends of the thrust bar to move a hook away from the chain as it is moved backward.

3. The combination in a lifting and pulling device, of a clevis having an extended arm, an operating lever pivotally supported in said clevis, oppositely disposed hooks adapted to engage a chain pivotally secured to each arm of the lever, a thrust bar pivoted at its center to the extended arm of the clevis, means for normally holding the thrust bar at right angles to the extended arm of the clevis, and means on each of the hooks for alternate engagement with the opposite ends of the thrust bar to move a hook outwards as it is moved backward.

4. The combination in a lifting and pulling device of a support, an operating lever pivotally mounted in said support, oppositely disposed hooks adapted to engage a chain pivotally secured to each arm of the lever, a thrust bar pivotally mounted at its center on said support, spring means for holding said thrust bar at right angles to the support, means on one hook for engaging the end of the thrust bar nearest that hook, and means on the other hook for engaging the end of the thrust bar nearest that hook, to move each hook outward as it is moved backward.

5. The combination in a lifting and pulling device, of a support, an operating lever pivotally secured to the support, oppositely disposed hooks adapted to engage draft means pivotally secured to each arm of the lever, a thrust bar on the support, means tending to draw the hooks together, and means on each of the hooks for alternate engagement with the thrust bar on backward movement of a hook to move that hook away from the draft means.

6. The combination in a lifting and pulling device, of a support, an operating lever pivotally mounted in the support, oppositely disposed hooks adapted to engage draft means pivotally secured to each arm of the lever, a thrust bar mounted on the support between the hooks for alternate engagement therewith to move each hook outwards as it is moved backward.

7. The combination in a lifting and pulling device, of a support, an operating lever pivotally mounted on the support, oppositely disposed hooks adapted to engage draft means pivotally secured to each arm of the lever, a thrust bar pivotally mounted on the support between the hooks for alternate engagement therewith to move each hook outwards as it is moved backward.

8. The combination in a lifting and pulling device, of a support, an operating lever pivotally mounted on the support, opposed hooks adapted to engage draft means pivotally secured to each arm of the lever, a thrust bar pivotally mounted on the support between the hooks for alternate engagement therewith to move each hook outward as it is moved backward, and means yieldably holding the thrust bar at right angles to the line of draft.

9. The combination in a lifting and pulling device of a support, an operating lever pivotally mounted on the support, oppositely disposed hooks adapted to engage draft means pivotally secured to each arm of the lever, a thrust bar pivotally mounted on the support between the hooks for alternate engagement of its opposite ends therewith to move each hook outward as it is moved backward.

FRANCIS D. PARKER.